United States Patent

Iyengar

(10) Patent No.: US 9,243,828 B2
(45) Date of Patent: Jan. 26, 2016

(54) METHOD OF MEASURING THE REFRIGERANT RECOVERED AND A REFRIGERANT RECOVERY AND RECHARGE DEVICE

(75) Inventor: Venkatesh Gorur Krishna Iyengar, Banagalore (IN)

(73) Assignees: Robert Bosch GmbH (DE); Bosch Limited (IN)

( * ) Notice: Subject to any disclaimer, the term of this patent is extended or adjusted under 35 U.S.C. 154(b) by 329 days.

(21) Appl. No.: 13/822,400

(22) PCT Filed: Aug. 29, 2011

(86) PCT No.: PCT/EP2011/064779
§ 371 (c)(1),
(2), (4) Date: May 24, 2013

(87) PCT Pub. No.: WO2012/034840
PCT Pub. Date: Mar. 22, 2012

(65) Prior Publication Data
US 2013/0247596 A1    Sep. 26, 2013

(30) Foreign Application Priority Data
Sep. 13, 2010 (IN) .............. 2662/CHE/2010

(51) Int. Cl.
*F25B 45/00* (2006.01)
*G05D 7/00* (2006.01)

(52) U.S. Cl.
CPC *F25B 45/00* (2013.01); *G05D 7/00* (2013.01); *F25B 2345/001* (2013.01); *F25B 2345/002* (2013.01); *F25B 2345/007* (2013.01); *F25B 2500/19* (2013.01); *Y10T 137/85986* (2015.04)

(58) Field of Classification Search
CPC .............. F25B 45/00; F25B 2345/001; F25B 2345/002

USPC ...................... 62/77, 149, 292, 298
See application file for complete search history.

(56) References Cited

U.S. PATENT DOCUMENTS 2,323,480 A * 7/1943 MacDougall ............... 236/99 R
4,601,177 A * 7/1986 Tanino et al. ................ 62/149
(Continued)

FOREIGN PATENT DOCUMENTS

CN    201363976 Y    12/2009
CN    201363976 Y    12/2009
(Continued)

OTHER PUBLICATIONS

International Search Report corresponding to PCT Application No. PCT/EP2011/064779, mailed Aug. 27, 2012 (German and English language document) (5 pages).
(Continued)

*Primary Examiner* — Melvin Jones
(74) *Attorney, Agent, or Firm* — Fishman Stewart Yamaguchi PLLC

(57) ABSTRACT

A method of measuring weight of the refrigerant recovered and a device for refrigerant recovery and recharge device is disclosed. A connection is established between the refrigerant recovery path and refrigerant recharge path. Refrigerant is filled in the refrigerant recovery path and the refrigerant recharge path. Once the refrigerant occupies the all components of the refrigerant recovery and recharge device, weight of the refrigerant storage tank is measured. The weight of the refrigerant storage tank is measured once before the recovery of the refrigerant from the refrigeration equipment and once after recovery of the refrigerant from the refrigeration equipment. Difference in the weights measured before recovery and after recovery is calculated to a get the amount of refrigerant recovered.

10 Claims, 2 Drawing Sheets

(56) References Cited

U.S. PATENT DOCUMENTS

| | | | |
|---|---|---|---|
| 5,161,385 | A | 11/1992 | Schumacher |
| 5,910,160 | A * | 6/1999 | Cakmakci et al. .............. 62/195 |
| 7,174,742 | B2 | 2/2007 | Thomas et al. |
| 2006/0196224 | A1 | 9/2006 | Esslinger |

FOREIGN PATENT DOCUMENTS

| | | | |
|---|---|---|---|
| EP | 0 472 854 | A1 | 3/1992 |
| EP | 0472854 | A1 | 3/1992 |
| WO | 89/05428 | A2 | 6/1989 |
| WO | WO-89/05428 | A2 | 6/1989 |
| WO | 03/089853 | A1 | 10/2003 |
| WO | WO-03/089853 | A1 | 10/2003 |

OTHER PUBLICATIONS

European Office Action for App. No. 11761305.9 dated Jul. 18, 2014.
Chinese Search Report dated Jul. 3, 2014 for App. No. 201180043817.1.
English Abstract for CN201363976Y.

* cited by examiner

METHOD OF MEASURING THE REFRIGERANT RECOVERED AND A REFRIGERANT RECOVERY AND RECHARGE DEVICE

This application is a 35 U.S.C. §371 National Stage Application of PCT/EP2011/064779, filed on Aug. 29, 2011, which claims the benefit of priority to Serial No. 2662/CHE/2010, filed on Sep. 13, 2010 in India, the disclosures of which are incorporated herein by reference in their entirety.

This disclosure relates to a method of measuring the refrigerant recovered and a refrigerant recovery and recharge device.

BACKGROUND

U.S. Pat. No. 7,174,742 discloses a device and method for the recovery of refrigerant from a refrigeration system using a refrigerant recovery and reclamation apparatus. The method uses weighing scales to monitor the weight of the refrigerant recovered. The weight of the refrigerant recovered in the refrigerant storage tank 18 is measured after the recovery of the refrigerant.

SUMMARY

The device for recovering refrigerant from refrigeration equipment and the method of measuring refrigerant recovered according to the description below have the following advantages.

The method and device ensures accurate measurement of the refrigerant that is recovered from the refrigeration equipment. This method compensates for the losses due to improper measurement of the weight of the refrigerant measured after the refrigerant is recovered from the refrigeration equipment. This method is advantageous to the consumer in a way that the consumer does not have to pay extra for the refrigerant that is recovered from a previous refrigerant recovery. The method is also advantageous to the refrigerant recovery service provider in a way that lower refrigerant weight measurement due to residual refrigerant that may be stuck to the components of the refrigerant recovery device does not happen. Thus accurate measurement of the refrigerant recovered from the refrigeration equipment is possible.

Further improvements and/or advantages are realized by the features described below.

By measuring weight of the refrigerant storage tank before and after recovery while there is no connection between the refrigeration equipment and the refrigerant recovery device ensures that an error weight of the refrigerant that may be stuck in the components of the refrigerant recovery and recharge device can be accounted and thus an accurate measurement of the refrigerant recovered is possible.

BRIEF DESCRIPTION OF THE DRAWINGS

Different modes of the disclosure are disclosed in detail in the description and illustrated in the accompanying drawing.

DETAILED DESCRIPTION

Figure 1:
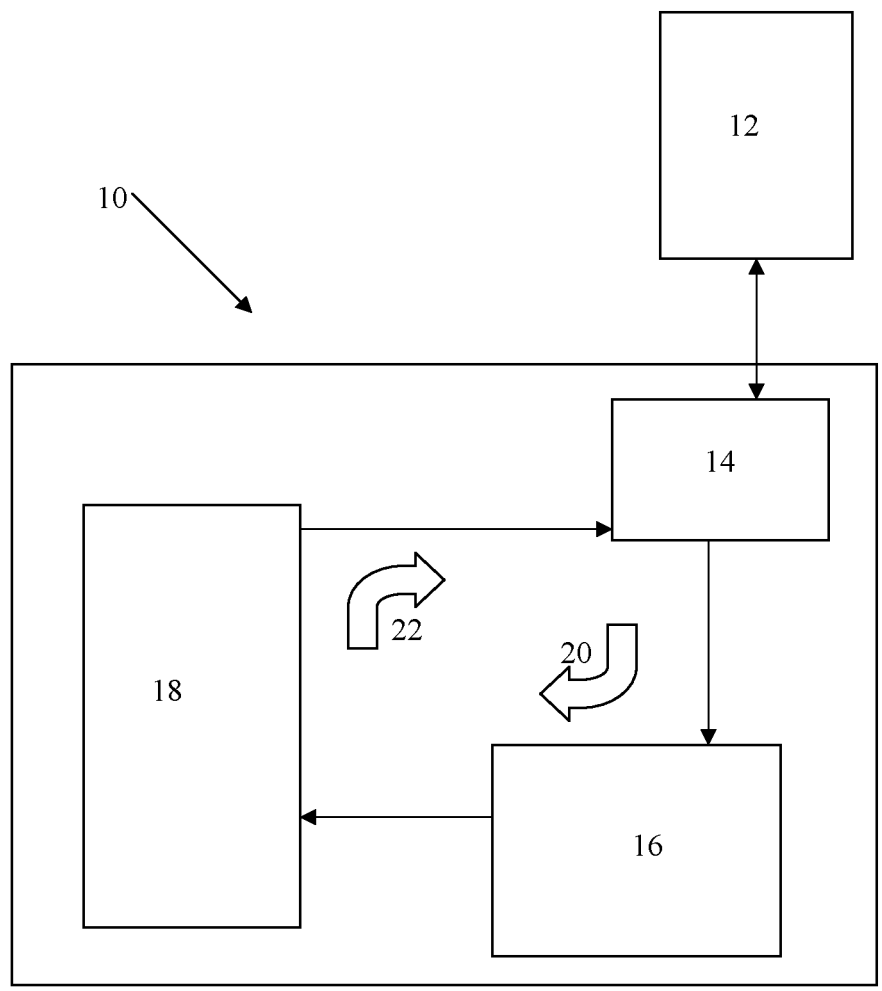
FIG. 1 illustrates a refrigerant recovery device comprising various components and connection between the various components.

FIG. 1 illustrates a refrigerant recovery and recharge device 10 comprising various components and connection between the components. The refrigerant recovery device comprises at least a valve block 14, a compressor 16 and a refrigerant storage tank 18. Two refrigerant flow paths can be clearly defined in the refrigerant recovery and recharge device. The first refrigerant flow path is called a refrigerant recovery path 20 which is established from the refrigeration recovery device 10 to the refrigeration equipment 12 through at least said valve block 14, a compressor 16 and refrigerant storage tank 18, the refrigerant path being adapted to recover refrigerant from said refrigeration equipment 12. The second refrigerant flow path is called a refrigerant recharge path 22 is established from the refrigerant recovery device 12 to the refrigeration equipment 12 through the valve block 14 and the refrigerant tank 18 adapted to recharge refrigerant to the refrigeration equipment 12.

Refrigeration equipments 12 are widely used in many applications including air conditioning systems, refrigerators and the like. These refrigeration equipments 12 use a refrigerant which provide cooling to an area or room in which they are fitted. The working principle of the refrigerant in the refrigeration equipment is such that it absorbs heat while passing through various components of the refrigeration equipment. This cools the air around the refrigeration equipment and the cool air is then blown to the area or room where the refrigeration equipment is installed.

Due to prolonged usage the refrigerant gets contaminated with oil and moisture, which also reduces the ability of the refrigerant to cool the area or room where the refrigeration equipments 12 are installed. Hence it is required that the refrigerant is removed from the refrigeration equipment 12 and is recharged with clean refrigerant. It is possible that the refrigerant is made free of contaminants by passing through various filtering stages in the refrigerant recovery device 10 and the contaminant free refrigerant is recharged to the refrigeration equipment. For the purpose of recovering the refrigerant and recharging the refrigerant a refrigerant recovery device 10 is used.

The refrigerant recovery and recharge device 10 is usually a stand alone device which is connected to the refrigeration equipment 12 while the refrigeration equipment 12 is being serviced. The refrigerant recovery and recharge device 10 comprises at least, a valve block 14, a compressor 16 and a refrigerant storage tank 18. The valve block 14 comprises valves, which are usually solenoid valves. The valves of the valve block 14 can be switched from a closed position to an open position, thereby establishing connection between the various components of the refrigerant recovery device 10. The valves in the valve block 14 can be switched between a closed position and an open position to establish a connection between the refrigerant recovery device 10 and the refrigeration equipment 12. The compressor 16 is a device which is capable of receiving fluid or vapours at a particular pressure and increases the pressure of the fluid or vapour that is received. The refrigerant storage tank 18 is a tank which is used to store the recovered refrigerant. The recovered refrigerant can be reused later.

While servicing refrigeration equipment 12 three particular tasks are involved viz (i) recovery of the refrigerant from the refrigeration equipment 12. (ii) evacuation of air and moisture from the refrigeration equipment 12 and (iii) refilling or recharging the refrigeration equipment 12 with clean refrigerant. The method used by a conventional refrigerant recovery device in the three tasks can be explained as follows. The valve block establishes a connection between the refrigerant recovery device and the refrigeration equipment. When the refrigerant recovery device is switched on the compressor is able to recover the refrigerant from the refrigeration device.

Once the refrigerant is recovered the valve block connects a vacuum pump to the refrigeration equipment 12. The vacuum pump then evacuates the refrigeration equipment 12. Once the refrigeration equipment 12 is evacuated the air and moisture and remaining recovered refrigerant is released to the atmosphere. After the evacuation the refrigeration equipment 12 is recharged with refrigerant.

Once the refrigerant is recovered in the refrigerant storage tank 18, the refrigerant storage tank 18 is weighed to check the amount of refrigerant being recovered. Depending on the weight of the refrigerant recovered customers can be charged for refilling that amount of refrigerant back to the refrigeration equipment.

One disadvantage of checking the weight of the refrigerant storage tank 18 only once, after refrigerant is recovered is that some refrigerant may already be stuck in the various components of the refrigerant recovery device 10 from a previous refrigerant recovery operation. Due to this additional weight of the refrigerant gets added to the refrigerant which is now being recovered. Thus the customer would need to pay additional money for some refrigerant that was previously recovered from the refrigeration equipment 12 but was present in the components of the refrigerant recovery device 10. Similarly, while recovering some refrigerant may get stuck in the components and hence the final weight of the refrigerant recovered would be lower than the actual recovered refrigerant. This would lead to the refrigeration equipment service provider having to suffer a loss since final weight of the refrigerant recovered would be lower than the actual value of refrigerant recovered. This would also lead to less amount of refrigerant be recharged into the refrigeration equipment 12.

Figure 2:
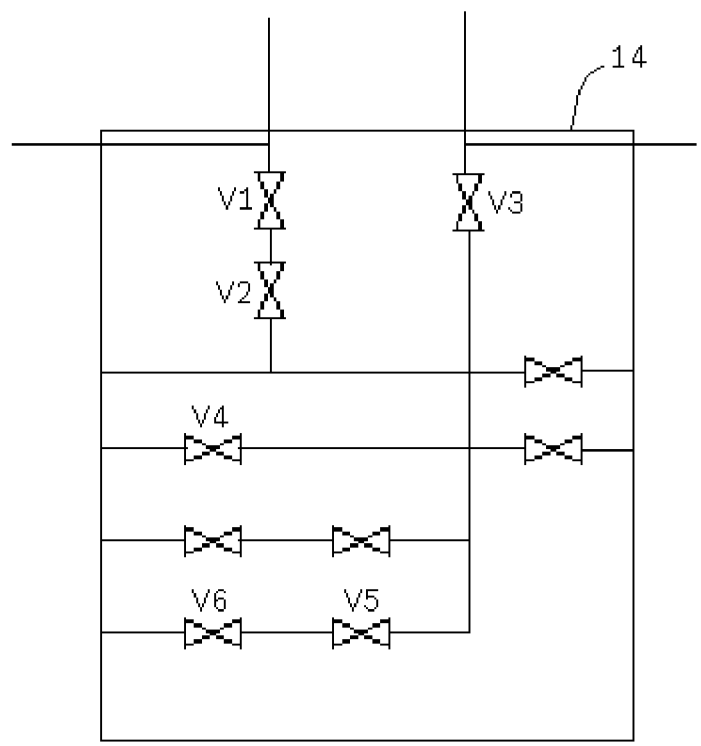
FIG. 2 illustrates a valve block representing various valves.

FIG. 2 illustrates a valve block 14 with various valves V1, V2, V3, V4, V5, V6 and the like. The valves in the valve block 14 allow a connection to be established between the refrigerant recovery device 10 and the refrigeration equipment 12. When a process for the recovery of refrigerant from the refrigeration equipment through the refrigerant recovery path 20 a connection is established at least between the valves V1, V2, V3, V5 and V6. When a process for recharging refrigerant from the refrigerant storage tank 18 of the refrigerant recovery and recharge device 10 through refrigerant recharge path is started a connection is established between the valves V1, V2, V3 and V4. The valves in the valve block 14 can be switched from a closed position to an open position in order to establish a connection between the refrigeration equipment 12 and components of the refrigerant recovery device 10. The switching of the valves may be done manually or may be electronically controlled.

In accordance with this disclosure, the refrigerant recovery and recharge device 10 is able to account for the residual refrigerant that may be stuck in the components of the refrigerant recovery device 10 before or after the refrigerant is recovered from the refrigeration equipment 12. Thus the weight of the refrigerant recovered from the refrigeration equipment 12 is measured accurately. This also helps to recharge the exact amount of refrigerant recovered from the refrigeration equipment 12.

The method for measuring the weight accurately can be explained as follows. Before the start of the refrigerant recovery process through the refrigerant recovery path from the refrigeration equipment 12, a connection is established between the refrigerant recovery path 20 and the refrigerant recharge path 22 without establishing connection between the refrigeration equipment 12 and the refrigerant recovery device. For this purpose (referring to FIG. 2) a connection is established between the valves V4, V5 and V6. Once this connection is established the refrigerant recovery path 20 and the refrigerant recharge path is filled with refrigerant. The refrigerant now occupies all parts of the refrigerant recovery and recharge device 10. The weight of the refrigerant storage tank 18 is measured. This weight is recorded as weight W1 of the refrigerant storage tank 18 prior to recovering the refrigerant from the refrigeration equipment 12.

After recording the weight W1 of the refrigerant, the valves V1, V2, V3, V5 and V6 from the valve block 14 are then switched such that a connection is established between the refrigerant recovery device 10 and the refrigeration equipment 12. When the connection is established, the compressor 16 is switched on. Due to this pressure difference the refrigerant flow from the high pressure refrigeration equipment 12 to the lower suction pressure inlet of the compressor 16. The recovered refrigerant is then compressed to increases the pressure of the refrigerant. Further the pressurized refrigerant is cooled and stored in the refrigerant storage tank 18. This recovery and storage of the refrigerant continues until the pressure equalization between the refrigerant equipment and the refrigerant recovery and recharge device takes place.

After the recovery of the refrigerant, the refrigeration equipment 12 is disconnected from the refrigerant recovery and recharge device 10 by switching at least valves from the valve block 14 to a closed position. The valves V4, V5 and V6 in the valve block 14 are then switched on such that a connection is established between refrigerant recovery path 20 and the refrigerant recharge path 22. Once this connection is established the refrigerant recovery path 20 and the refrigerant recharge path 22 is filled with refrigerant. The refrigerant now occupies all parts of the refrigerant recovery and recharge device 10. The weight of the refrigerant storage tank 18 is measured. This weight is recorded as weight W2 of the tank after completion of the recovery of refrigerant from the refrigeration equipment.

The difference between the weights W2 and W1 of the refrigerant storage tank 18 measured before refrigerant recovery from the refrigeration equipment 12 and after completion of refrigerant recovery from the refrigeration equipment 12 gives the weight of the refrigerant that is recovered.

The advantage of this method is that by filling the refrigerant recovery path 20 and the refrigerant recharge path 22 with refrigerant we are able to account of any residual refrigerant that may be stuck in the different components of the refrigerant recovery and recharge device 10. This allows for accurate measurement of the refrigerant that is recovered from the refrigeration equipment 12 and that should be recharged into the refrigeration equipment 12.

Measuring the weight of the refrigerant storage tank 18 is done internally. The important part of this disclosure is the moment in time when the weight of the refrigerant storage tank is measured both before recovery and after recovery of the refrigerant. While filling the refrigerant recovery path 20 and the refrigerant recharge path 22 with the refrigerant it is observed that the weight of the refrigerant storage tank 18 reduces. This reduction in weight of the refrigerant storage tank continues until the time when the refrigerant start to fill into the refrigerant storage tank 18 after being filled in all other components of the refrigerant recovery and recharge device 10. In case of measuring the weight of the refrigerant storage tank 18 to get accurate measurements. It is critical that the weight be measured just before the weight of the refrigerant storage tank 18 starts to increase.

Optionally a controller may be used to monitor the transition in weight (increase to decrease or vice versa) of the refrigerant storage tank 18. The controller would be able to store the weight transition values in its memory. Thus it would be possible to accurately measure the weight of the refrigerant from the refrigeration equipment 12 even at a later instant in time. The controller is also able to calculate the difference in weight measured before recovery and after recovery.

Another advantage of this disclosure is that this method of measuring weight of the refrigerant storage tank is not affected by ambient pressure or temperature. Further the changing characteristics of the refrigerant such as density due to changing temperature or pressure will have no effect on the weight of the refrigerant storage tank 18 measured before recovery and after recovery.

The invention claimed is:

1. A method of measuring weight of recovered refrigerant, comprising:
   (i) connecting a refrigerant recovery path and refrigerant recharge path through a valve block;
   (ii) filling said refrigerant recovery path and refrigerant recharge path with refrigerant from a refrigerant storage tank;
   (iii) measuring a first weight of the refrigerant storage tank;
   (iv) connecting refrigeration equipment to said refrigerant recovery path through said valve block and recovering said refrigerant;
   (v) connecting the refrigerant recovery path and refrigerant recharge path through said valve block;
   (vi) filling said refrigerant recovery path and refrigerant recharge path with refrigerant from the refrigerant storage tank;
   (vii) measuring a second weight of the refrigerant storage tank; and
   (viii) calculating a difference between the first weight and the second weight.

2. The method as claimed in claim 1, wherein measuring the first weight and the second weight of the refrigerant storage tank is done internally.

3. The method as claimed in claim 1, wherein measuring the first weight and the second weight of the refrigerant storage tank is done when there is no connection between a refrigerant recovery and recharge device and the refrigeration equipment.

4. The method as claimed in claim 1, Wherein the first weight and the second weight of the refrigerant storage tank are measured when a connection is established between said refrigerant recovery path and the refrigerant recharge path.

5. The method as claimed in claim 1, wherein the first weight and the second weight of the refrigerant storage tank decrease while said refrigerant recovery path and the refrigerant recovery path are filled with refrigerant.

6. The method as claimed in claim 1, wherein the first weight and the second weight of the refrigerant storage tank are measured just before the weight of the refrigerant storage tank starts to increase while filling the refrigerant recovery path and the refrigerant recharge path with refrigerant.

7. The method as claimed in claim 1, wherein the first weight and the second weight of the refrigerant storage tank are measured before recovery of refrigerant from said refrigeration equipment.

8. The method as claimed in claim 1, wherein the first weight and the second weight of the refrigerant storage tank are measured after recovery of refrigerant from said refrigeration equipment.

9. A device for recovering refrigerant from a refrigeration equipment, said device comprising:
   a valve block having at least one valve;
   a compressor;
   a refrigerant tank;
   a refrigerant recovery path established from the device to the refrigeration equipment through said valve block, the compressor and the refrigerant storage tank, the refrigerant recovery path adapted to recover refrigerant from said refrigeration equipment;
   a refrigerant recharge path established from said device to said refrigeration equipment through said valve block and said refrigerant storage tank, the refrigerant recharge path adapted to recharge refrigerant to said refrigeration equipment, wherein said valve block is configured to establish a connection between said refrigerant recovery path and refrigerant recharge path when connection between said refrigeration equipment and said device is not established; and
   a controller configured to operate the valve block to:
      fill the refrigerant recovery path and refrigerant recharge path with refrigerant from the refrigerant tank and measure a first weight of the refrigerant tank before connection of the device to the refrigeration equipment; and
      after connection of the device to the refrigeration equipment and after the refrigerant is discharged from the refrigeration equipment, fill the refrigerant recovery path and refrigerant recharge path with refrigerant from the refrigerant tank and measure a second weight of the refrigerant tank;
      such that an amount of refrigerant to recharge to the refrigeration equipment can be calculated based on the first weight and the second weight.

10. The device as claimed in claim 9, wherein:
   said valve block includes at least one valve, and
   said valve block is configured to establish a connection between said refrigerant recovery path and the refrigerant recharge path before recovery of refrigerant from said refrigeration equipment and after completion of refrigerant recovery from said refrigeration equipment.

* * * * *